US 10,380,075 B2

(12) United States Patent
Mohamed

(10) Patent No.: US 10,380,075 B2
(45) Date of Patent: Aug. 13, 2019

(54) LIMITING SHARING OF A STORED FILE

(71) Applicant: Microsoft Technology Licensing, LLC, Redmond, WA (US)

(72) Inventor: Sabrina A. Mohamed, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 237 days.

(21) Appl. No.: 15/432,007

(22) Filed: Feb. 14, 2017

(65) Prior Publication Data

US 2018/0232392 A1 Aug. 16, 2018

(51) Int. Cl.
*G06F 21/62* (2013.01)
*G06F 16/176* (2019.01)

(52) U.S. Cl.
CPC ........ *G06F 16/176* (2019.01); *G06F 21/6218* (2013.01)

(58) Field of Classification Search
CPC .............................. G06F 16/176; G06F 21/6218
See application file for complete search history.

(56) References Cited

U.S. PATENT DOCUMENTS

| 8,127,365 | B1 | 2/2012 | Liu et al. | |
|---|---|---|---|---|
| 8,972,449 | B2 | 3/2015 | Lim | |
| 9,747,275 | B1* | 8/2017 | Barsness | H04W 4/025 |
| 2006/0005247 | A1 | 1/2006 | Zhang et al. | |
| 2006/0218149 | A1* | 9/2006 | Patrick | G06F 21/6218 |
| 2012/0011192 | A1* | 1/2012 | Meister | G06Q 10/107 |
| | | | | 709/203 |
| 2013/0073621 | A1 | 3/2013 | Waddoups et al. | |
| 2014/0123237 | A1* | 5/2014 | Gaudet | H04L 63/08 |
| | | | | 726/4 |
| 2014/0188921 | A1 | 7/2014 | Thomason et al. | |
| 2014/0351288 | A1 | 11/2014 | Donze | |
| 2015/0007264 | A1* | 1/2015 | Maldaner | H04L 67/1097 |
| | | | | 726/3 |
| 2015/0222665 | A1* | 8/2015 | Eberlein | H04L 63/20 |
| | | | | 726/1 |

(Continued)

FOREIGN PATENT DOCUMENTS

CN 103237276 A 8/2013

OTHER PUBLICATIONS

"Set file sharing permissions for your organization", https://support.google.com/a/answer/60781?hl=en, Retrieved on: Dec. 28, 2016, 3 pages.

(Continued)

*Primary Examiner* — Robert W Beausoliel, Jr.
*Assistant Examiner* — Arthur Ganger
(74) *Attorney, Agent, or Firm* — Michael Best & Friedrich LLP

(57) ABSTRACT

Systems and methods for limiting sharing of a stored file. One system includes an electronic processor configured to receive a request to share the stored file with a recipient, wherein the request includes an identifier of the recipient, and determine whether sharing of the stored file with the recipient is restricted based on the identifier of the recipient and content of the stored file. The electronic processor is also configured to, when the sharing of the stored file with the recipient is restricted, generate, in response to the request, a notification that sharing of the stored file with the recipient is restricted.

17 Claims, 6 Drawing Sheets

(56) References Cited

U.S. PATENT DOCUMENTS

2017/0078321 A1* 3/2017 Maylor ............... H04L 63/1433
2017/0244599 A1* 8/2017 Li ......................... H04L 51/08

OTHER PUBLICATIONS

"Share sites or documents with people outside your organization", https://support.office.com/en-gb/article/Share-sites-or-documents-with-people-outside-your-organization-80e49744-e30f-44db-8d51-16661b1d4232, Retrieved on: Dec. 28, 2016, 13 pages.
Ganesh, et al., "Protection of Shared Data among Multiple Users for Online Social Networks", In International Conference on Contemporary Computing and Informatics, Nov. 27, 2014, pp. 768-773.

* cited by examiner

LIMITING SHARING OF A STORED FILE

FIELD

Embodiments described herein relate to limiting sharing of a stored file, and, more particularly, to limiting sharing of the stored file with particular recipients based on the content of the stored file.

SUMMARY

A file hosting service allows users to upload and store files. A file hosting service may also allow users to share stored files with one or more additional users. For example, in some embodiments, the file hosting service provides a link to a stored file, which may be shared with another user (a recipient). Upon receiving the link, the recipient may select the link to access the stored file.

When a stored file includes restricted data, such as social security numbers, trade secrets, or other sensitive or protected data, only particular users may be authorized to access the stored file. In these situations, when a link to a stored file is shared with a recipient who is not authorized to access the stored file, the file hosting service blocks the recipient from accessing the file. The recipient, however, may be confused regarding why he or she received the link to the stored file but cannot access the stored filed. Similarly, the user who shared the link with the recipient may be unaware that the recipient cannot access the stored file. Accordingly, although the file hosting service blocks access to a stored file to prevent unauthorized access by unauthorized users, a recipient may receive a link to the stored file that the recipient is not authorized to access, which causes confusion and may undermine data protection policies.

Thus, embodiments described herein provide systems and methods for limiting sharing of a stored file. For example, one embodiment provides a system for limiting sharing of a stored file. The system includes an electronic processor configured to receive a request to share the stored file with a recipient, wherein the request includes an identifier of the recipient, and determine whether sharing of the stored file with the recipient is restricted based on the identifier of the recipient and content of the stored file. The electronic processor is also configured to, when the sharing of the stored file with the recipient is restricted, generate, in response to the request, a notification that sharing of the stored file with the recipient is restricted.

Another embodiment provides a method of limiting sharing of a stored file. The method includes scanning content of each of a plurality of stored files to identify whether each of the plurality of stored files includes restricted data and setting a classification of each of the plurality of stored files based on the scanning. The method also includes receiving a request to share one of the plurality of stored files with a recipient, the request including an identifier of the recipient and determining, with an electronic processor, whether sharing of the one of the plurality of stored files with the recipient is restricted based on the classification of the one of the plurality of stored files and the identifier of the recipient. In addition, the method includes, when sharing of the one of the plurality of stored files with the recipient is restricted, generating, with the electronic processor, a notification in response to the request that sharing of the stored file with the recipient is restricted.

Yet another embodiment provides a computer-readable medium including instructions that, when executed by an electronic processor, cause the electronic processor to execute a set of functions. The set of functions includes receiving a request to share a stored file with a recipient, the request including an identifier of the recipient and determining whether sharing of the stored file with the recipient is restricted based on the identifier of the recipient and content of the stored file. The set of functions further includes, when sharing of the stored file with the recipient is restricted, generating, in response to the request, a notification that sharing of the stored file with the recipient is restricted.

DETAILED DESCRIPTION

Figure 1:
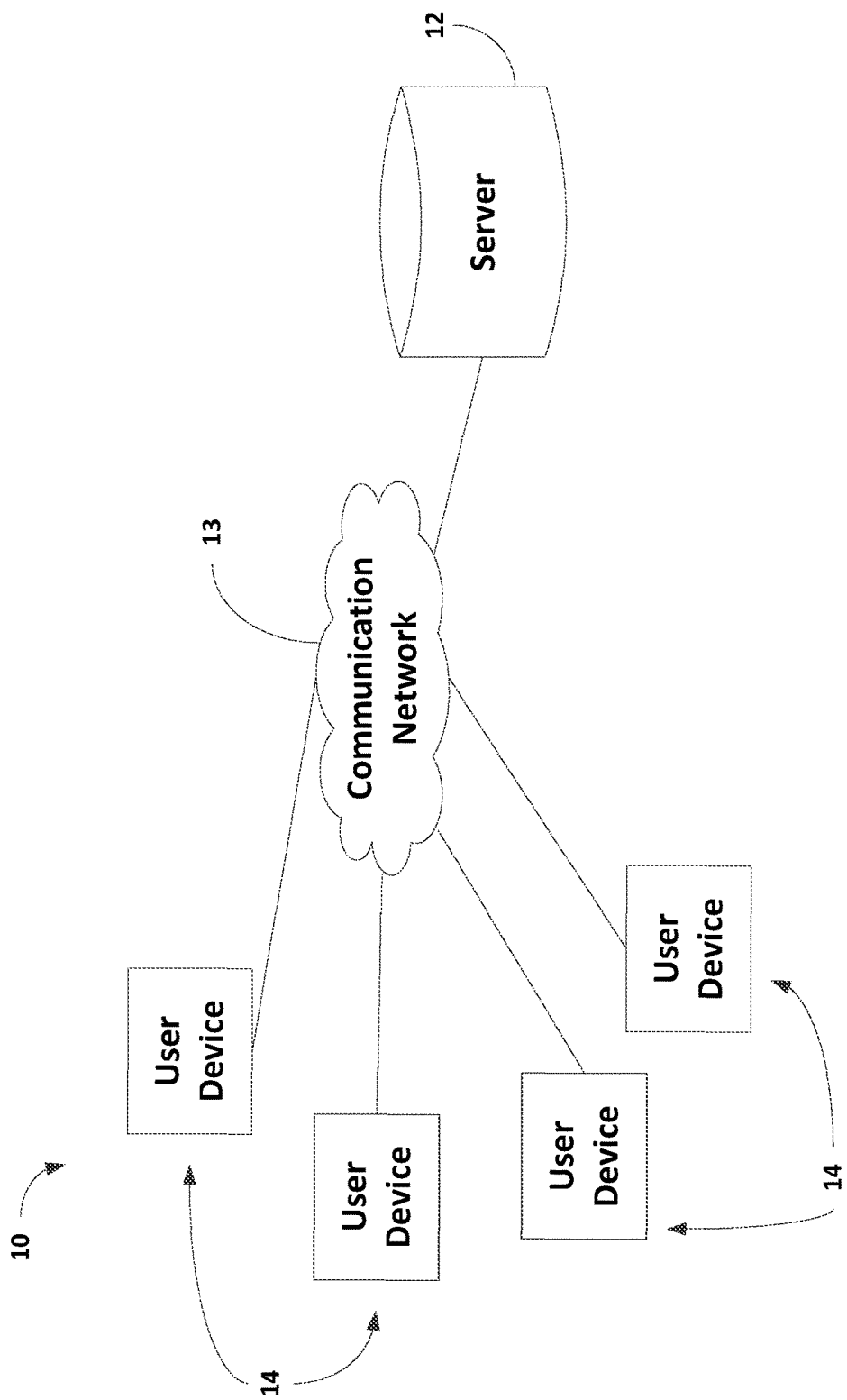
FIG. 1 schematically illustrates a system for limiting sharing of a stored file according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer readable medium" comprises all computer-readable media but does not include a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, access to a stored file may be limited based on file properties, such as the contents of the file and whether the file includes restricted data. In one embodiment, restricted data means data classified as sensitive or protected data, such as social security numbers, trade secrets, banking or financial information, or other information where access to the data is limited. In some embodiments, data protection policies may be automatically or manually applied to the content of a file to determine whether to classify a file as restricted. When a stored file is classified as restricted, only particular users are permitted to access the file. However, a user may be permitted to share a link to the file with a recipient who is not authorized to access the file. When the recipient selects the link, the recipient is denied access. Accordingly, access is not denied until the recipient attempts to access the file. Thus, the recipient may be confused regarding why he or she has been denied access, and the sender of the link may wrongly conclude that the recipient has received access to the file. Furthermore, the link itself may provide data to the recipient regarding the existence of a file or other metadata regarding the file, which may undermine data protection policies.

Accordingly, embodiments described herein limit sharing of stored files when a stored file is classified as restricted. For example, when a sender attempts to share a stored file with a recipient, the request to share the stored file is verified and is denied if the stored file is classified as restricted and the recipient is not authorized to access the stored file. In this way, the sender of the link to the stored file is alerted to the fact that he or she is attempting to share access to a restricted file with an authorized recipient, and the recipient of a link only receives links to stored files that he or she is authorized to access.

Embodiments are described herein with reference to a file hosting service. However, it should be understood that the embodiments described herein are not limited to being used with such a hosting service and may be used in any device or system when a user is attempting to share a link to a stored file. As used in the present application, a stored file may include a document, an image, a video, an audio file, a spreadsheet, a data file, and the like. Also, in one embodiment, sharing a link to a stored file as described in the present application includes providing an identifier of a stored file, which may include, for example, a hyperlink, a pointer, a file name, or the like.

FIG. 1 schematically illustrates a system 10 for limiting sharing of a stored file according to some embodiments. As illustrated in FIG. 1, the system 10 includes a server 12 and one or more user devices 14 (referred to herein collectively as "the user devices 14" and individually as "a user device 14"). The server 12 and the user devices 14 communicate over one or more wired or wireless communication networks 13. Portions of the communication networks 13 may be implemented using a wide area network, such as the Internet, a local area network, such as a Bluetooth™ network or Wi-Fi, and combinations or derivatives thereof.

As described in more detail below, the server 12 provides a file hosting service that allows the user devices 14 to manage files, such as by uploading and storing files, accessing stored files, sharing stored files, and the like. In some embodiments, the user devices 14, or a subset thereof, may be associated with users included in a predetermined group of users, such as an organization of users (an enterprise, a committee, a department, a class, a team, and the like). However, in other embodiments, the user devices 14, or a subset thereof, may be associated with unrelated individual users of the file hosting service provided by the server 12. It should be understood that the server 12 may communicate with any number of user devices 14 and four user devices 14 are illustrated in FIG. 1 purely for illustrative purposes. Also, in some embodiments, a user device 14 and the server 12 may communicate through one or more interim devices.

Figure 2:
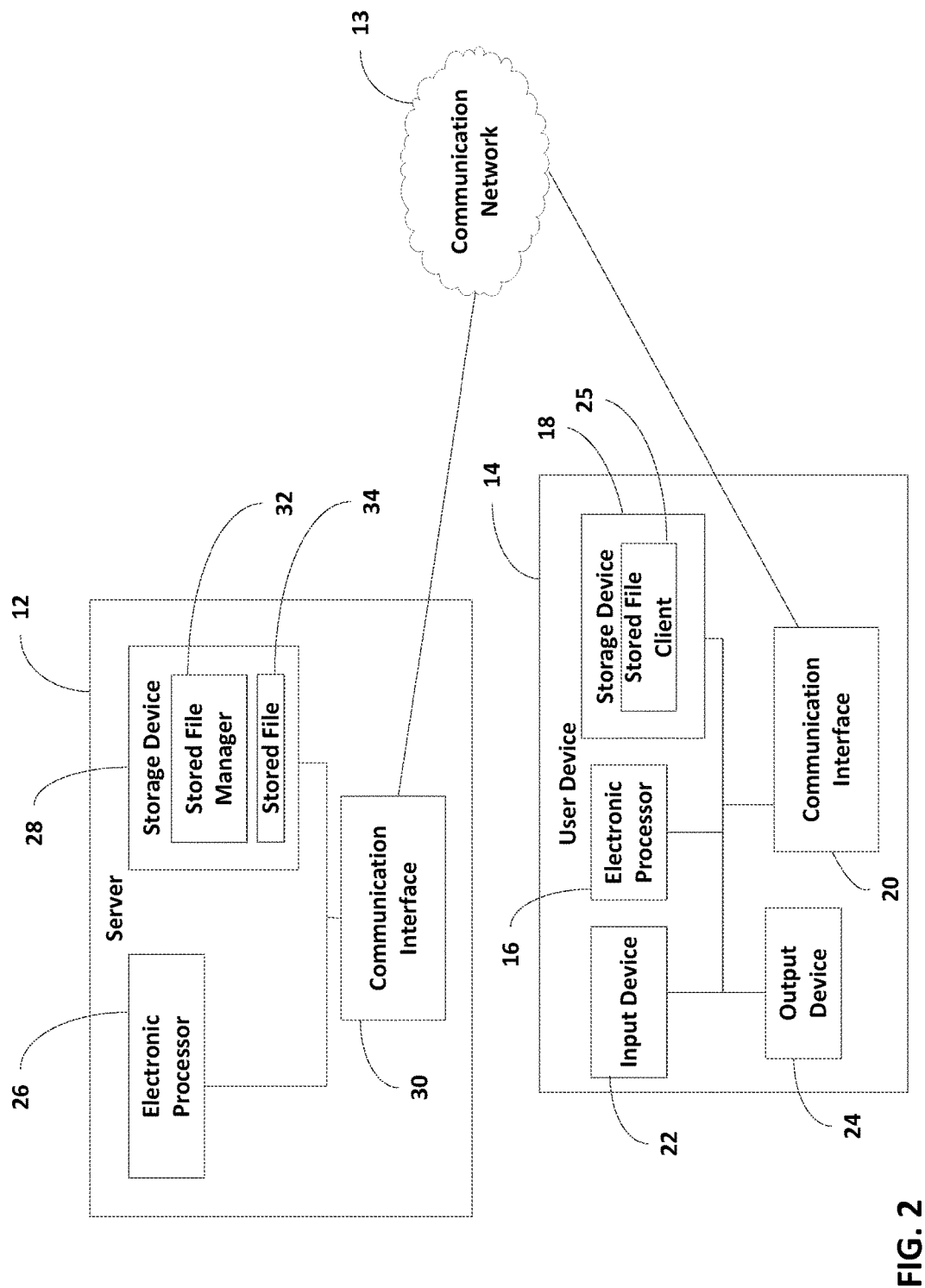
FIG. 2 schematically illustrates a user device and a server included in the system of FIG. 1 according to some embodiments.

The user devices 14 includes one or more desktop computers, laptop computers, tablet computers, terminals, smart telephones, smart televisions, smart wearables, servers, databases, other types of computing devices, or a combination thereof. As illustrated in FIG. 2, a user device 14 may include an electronic processor 26 (for example, a microprocessor, application-specific integrated circuit (ASIC), or another suitable electronic device), a storage device 28 (for example, a non-transitory, computer-readable storage medium), and a communication interface 30, such as a transceiver that communicates with the server 12 over the communication network 13 and, optionally, one or more other communication networks or connections. Additionally, in some embodiments, a user device 14 may include one or more input devices 22, one or more output devices 24, or a combination thereof. The electronic processor 16, the storage device 18, the communication interface 20, the input devices 22, and the output devices 24 communicate wirelessly, over one or more communication lines or buses, or a combination thereof. It should be understood that a user device 14 may include additional components than those illustrated in FIG. 2 in various configurations and may perform additional functionality than the functionality described herein.

The input devices 22 may include a keypad, a button, a keyboard, a mouse, a touchscreen, a trackball, a joystick, a camera, a microphone, and the like for receiving input from a user of the user device 14. The output devices 24 may include a display device, a speaker, a printer, and the like for providing output to a user of the user device 14. In some embodiments, an input device 22 may also operate as an output device 24, such as when the input device 22 includes a touchscreen. As described in more detail below, the input devices 22 and output devices 24 may allow a user to communicate with the server 12 and, in particular, one or more user interfaces that allow a user to manage files stored in the file hosting service and, in particular, make a request to share a stored file.

The electronic processor 16 is configured to retrieve instructions and data from the storage device 18 and execute, among other things, the instructions. For example, in some embodiments, the electronic processor 16 is configured to execute a stored file client 25 stored in the storage device 18. The stored file client 25 may include a browser application or another software application that enables the user device 14 to communicate with the server 12 and participate in the file hosting service provided by the server 12.

As illustrated in FIG. 2, similar to the user device 14, the server 12 includes an electronic processor 26 (for example, a microprocessor, application-specific integrated circuit (ASIC), or another suitable electronic device), a storage device 28 (for example, a non-transitory, computer-readable storage medium), and a communication interface 30, such as a transceiver, for communicating over the communication network 13 and, optionally, one or more additional communication networks or connections. The electronic processor 26, the storage device 28, and the communication interface 30 communicate wirelessly, over one or more communication lines or buses, or a combination thereof. It should be understood that the server 12 may include additional components than those illustrated in FIG. 2 in various configurations and may perform additional functionality than the functionality described herein. For example, in some embodiments, the functionality described herein as being performed by the server 12 may be distributed among multiple servers or devices collectively referred to as the server. For example, the multiple servers or devices may form a cloud-based implementation to perform the functionality described herein via cloud computing.

The electronic processor 26 included in the server 12 is configured to retrieve instructions and data from the storage device 28 and execute, among other things, the instructions to perform a set of functions in including the methods described herein. As illustrated in FIG. 2, in some embodiments, the storage device 28 includes a stored file manager 32. The stored file manager 32 is a software application executable by the electronic processor 26. As illustrated in FIG. 2, in some embodiments, the storage device 28 also includes one or more stored files 34. As described below, the stored file manager 32, when executed by the electronic processor 26, controls the sharing of stored files. For example, the electronic processor 26 may execute the stored file manager 32 to control sharing of the stored files 34 stored in the storage device 28. Alternatively or in addition, the electronic processor 26 may execute the stored file manager 32 to control sharing of files stored in other storage devices included in the server 12, other servers, or other devices external to the server 12. For example, in some embodiments, the electronic processor 26 executes the stored file manager 32 to control sharing of files stored in the storage device 18 of a user device 14. Also, it should be understood that the functionality described herein as being performed by the stored file manager 32 may be distributed among multiple software applications. Furthermore, the stored file manager 32 may perform additional functionality than the functionality described herein. For example, in some embodiments, the stored file manager 32 also controls uploading and storing of files and controls access to stored files, including blocking unauthorized users from accessing a restricted file. Similarly, as described below, the stored file manager 32 may automatically process the contents of a stored file (by applying data protection policies) to classify a stored file as restricted when appropriate. An administrator associated with the file hosting service, a user device 14, an organization associated with the user devices 14, or a combination thereof may establish the particular data protection policies used to classify stored files.

As described above, when a link to a stored file is shared to a recipient who is not authorized to access the file, the recipient and the user who shared the link may be confused regarding whether the file is restricted. In addition, the recipient of the link may improperly receive data regarding the file through the link itself. Accordingly, to control the sharing of a stored file, the stored file manager 32 executed by the electronic processor 16 of the server 12 receives a request to share a stored file and allows or denies the request depending on whether the stored file is classified as restricted and whether the intended recipient of the shared file is authorized to access the stored file.

Figure 3:
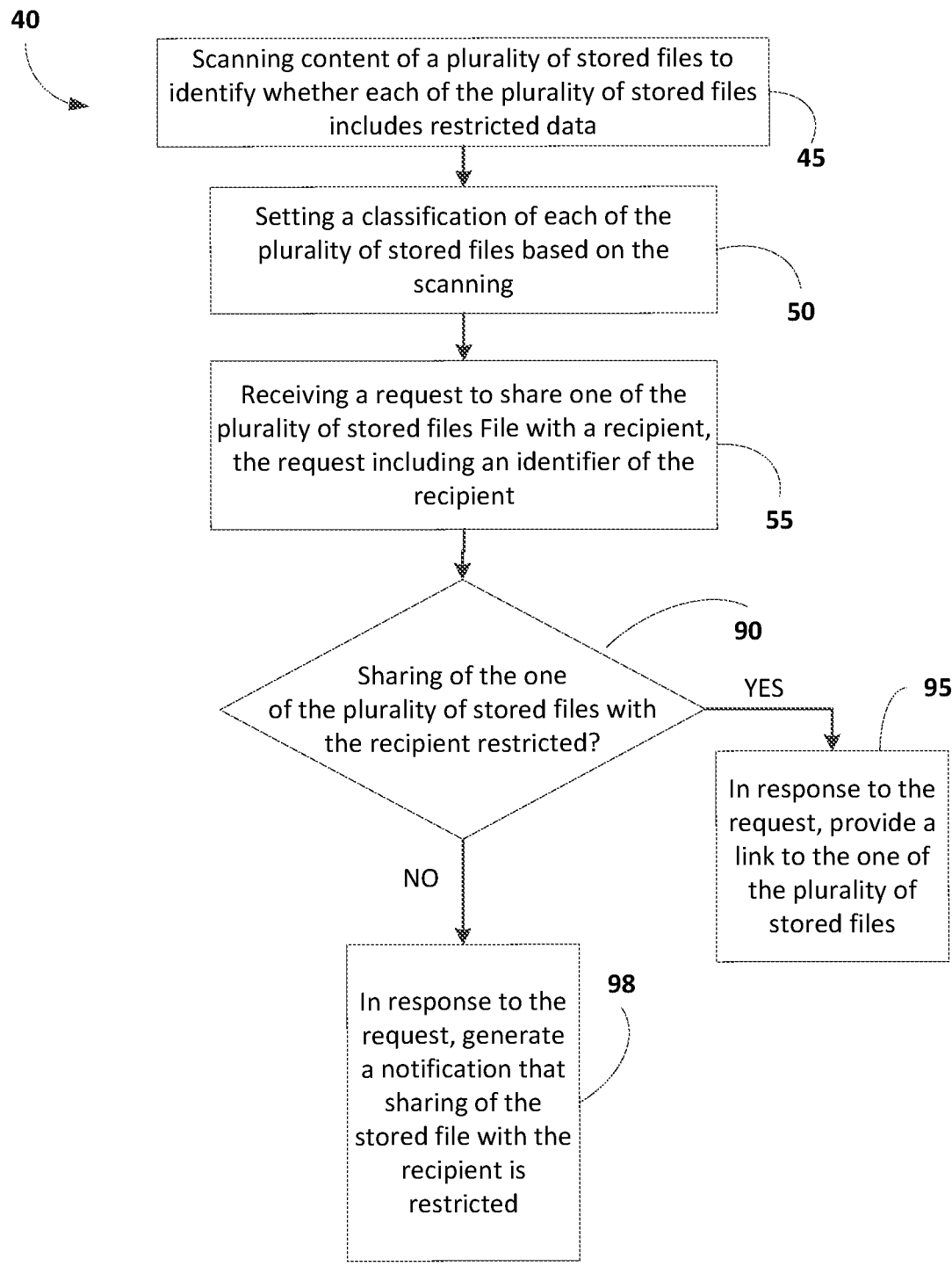
FIG. 3 is a flowchart illustrating a method of limiting sharing of a stored file performed by the system of FIG. 1 according to some embodiments.

For example, FIG. 3 is a flowchart illustrating a method 40 of limiting sharing of a stored file according to some embodiments. As illustrated in FIG. 3, the method 40 includes scanning the content of stored files to identify whether each stored file includes restricted data (at block 45). In one embodiment, the scanned content of the stored filed includes content that is output (for example, displayed) to a user when a user accesses the stored file. Alternatively or in addition, in some embodiments, the scanned content of the stored file includes metadata for the stored file, such as properties of the file including a date of creation, an author, an edit date, a storage location, and the like. Techniques for scanning files and applying data protection policies to identify whether a file includes restricted data are well known and, thus, are not described in detail herein. However, it should be understood that, the server 12 (the stored file manager 32 or a separate software application), a separate server 12, a user device 14, or a combination thereof may perform the scanning. For example, in some embodiments, the stored file manager 32 may scan the content of the stored file when the stored file is initially uploaded to and stored to the file hosting service, whenever the content of the stored file is updated, when a request to share the stored file is received, or any combination thereof.

As illustrated in FIG. 3, based on the scanning, a classification is set for each of the stored files (at block 50). For example, when the scan identifies that a stored file includes restricted data, the classification of the stored file may be set to restricted. In contrast, when the scan identifies that a stored file does not include any restricted data, the classification of the stored file may be set to unrestricted. A classification of restricted means that sharing of the stored file is limited, such that the stored file may only be shared with particular users or may not be shared at all. In contrast, a classification of unrestricted means that sharing of the stored file is not limited and the stored file may be shared without restriction. In some embodiments, the classification of restricted or unrestricted may also be used to control access of the stored file. For example, when a stored file is classified as restricted based on the scan, sharing of the stored file may be limited as well as access to the stored file. In other embodiments, a first classification may be used to control sharing of a stored file and a second, different classification may be used to control access of a stored file. It should also be understood that other classifications may be set for a stored file than just restricted or unrestricted and other terms may be used to designation whether a file is classification as having sharing restrictions. Furthermore, in some embodiments, the classification may indicate a list of permitted identifiers or a list of blocked identifiers that identity users that a stored file may be shared with or not shared with, respectively. Accordingly, in addition to specifying whether sharing of the stored file is restricted, the classification may indicate who may or may not access the stored file. In some embodiments, this information may be included in the classification or may be separately stored with the stored file or separate from the stored file. For example, the classification set for a stored file may designate a particular level of restricted access that may be mapped to a separate list of permitted identifiers or blocked identifiers.

As illustrated in FIG. 3, the method 40 also includes receiving, with the stored file manager 32 (as executed by the electronic processor 26), a request to share the stored file with a recipient (at block 55). The request includes an identifier of the recipient. The identifier of the recipient may include, for example, an email address, a first and last name, a screen name, a telephone number, an identification number, and the like.

Figure 4:
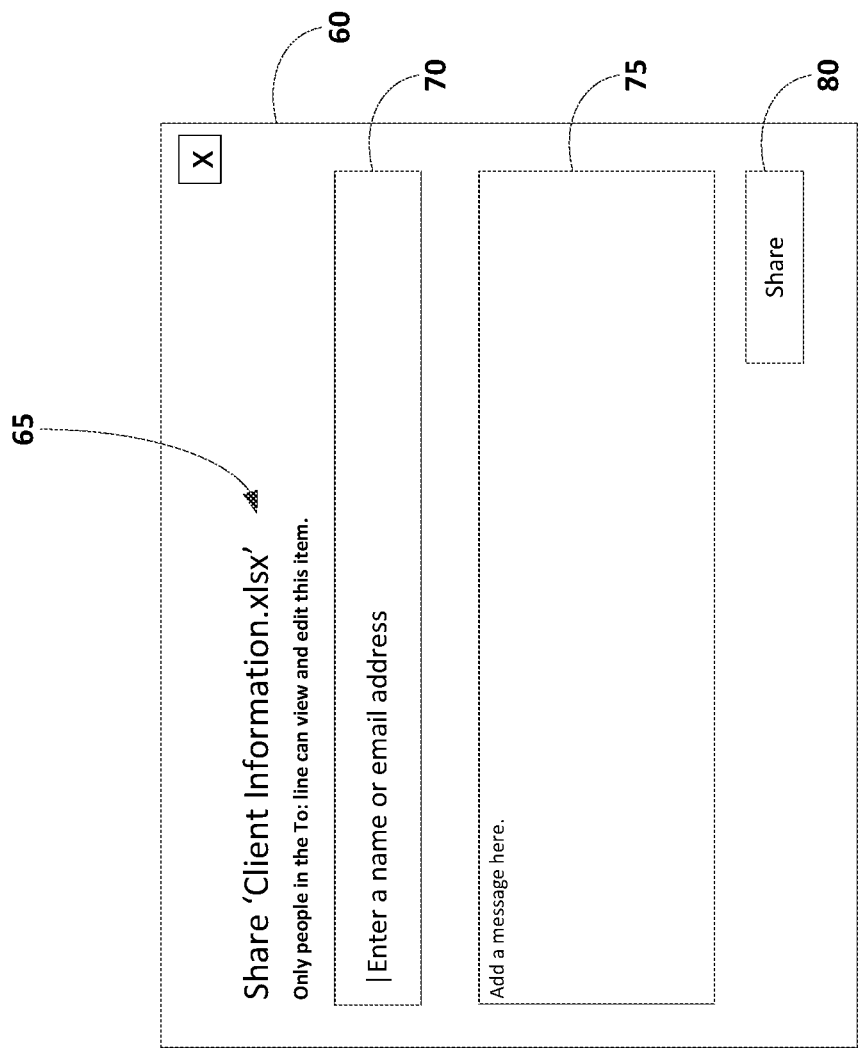
FIG. 4 illustrates a user interface for receiving a request to share a stored file with a recipient according to some embodiments.

In some embodiments, the stored file manager 32 receives the request from one of the user devices 14. For example, the electronic processor 16 included in a user device 14 may execute the stored file client 25 to communication with the server 12 and, in particular, access one or more user interfaces for managing files stored by the file hosting service. Through the user interfaces, the user may select (using one or more input devices 22) a stored file and initiate a request to share the selected file (for example, by selecting a "share" button included in the user interfaces). In particular, after selecting a stored file for sharing, the user interfaces may prompt the user for an identifier of a recipient with who the stored file will be shared. For example, FIG. 4 illustrates a user interface 60 accordingly to one embodiment. The user interface 60 includes an identifier 65 of the stored file selected by the user and also includes a recipient field 70 and an optional message field 75. The recipient field 70 receives the identifier of the recipient. For example, a user may use an input device 22 to type an identifier of the recipient, such as an email address, may select an identifier from a drop-down menu or other selection mechanism associated with the recipient field 70, or a combination thereof. Similarly, a user may use an input device 22 to type a message to the recipient into the message field 75. It should be understood that the recipient field 70 may allow a user to enter multiple identifiers to specify more than one recipient. After specifying one or more recipients and an optional message for the recipients, the user may select a share button 80 included in the user interface 60. After the user selects the share button 80, the request is transmitted to the stored file manager 32 over the communication network 13.

When the stored file manager 32 receives the request, the stored file manager 32 determines whether sharing of the stored file with the recipient, as identified in the request, is restricted (at block 90). As described in more detail below, the stored file manager 32 may determine whether sharing of the stored file with the recipient is restricted based on the classification of the stored file and the identifier of the recipient. For example, the stored file manager may determine whether the classification of the stored file is set to restricted. When the classification of the stored file is not set to restricted (is set to unrestricted), no limits are placed on sharing, and the stored file manager 32 may respond to the request by providing a link to the stored file (at block 95).

Alternatively, when the classification of the stored file is set to restricted, the stored file manager 32 may determine whether sharing of the stored file with the recipient is restricted based on the identifier of the recipient included in the request. For example, in some embodiments, the stored file manager 32 may be configured to compare the identifier of the recipient with a list of permitted identifiers or a list of blocked identifiers to determine whether sharing of the file with the identified recipient is restricted. Similarly, in some embodiments, when the identifier of the recipient included in the request is an email address, the stored file manager 32 may be configured to determine whether sharing of the stored file with the recipient is restricted by comparing a first domain included in the email address with a second domain, which is associated with a particular organization, such as an enterprise associated with the user making the request to share the stored file. For example, the classification of a stored file may specify whether the stored file may be shared with recipients external to a particular organization. Thus, when the classification for the stored file is set to restricted, the stored file manager 32 may compare the domain of a particular organization with the domain included in the identifier of the recipient to identify whether the recipient identified in the request is within or outside of a particular organization. The stored file manager 32 may perform similar comparisons with other types of identifiers, such as by comparing an area code or telephone extension with a predetermined area code or extension to determine whether sharing with the recipient identified in the request should be restricted.

Accordingly, when sharing of the stored file with the recipient is not restricted (at block 90), the stored file manager 32 may respond to the request by providing a link to the stored file (at block 95). Alternatively, when sharing of the stored file with the recipient is restricted, the stored file manager 32 may respond to the request by generating a notification that sharing of the stored file with the recipient is restricted (at block 98). The stored file manager 32 may output the notification to a source of the request, which may include transmitting the notification to the user device 14 that initiated the sharing request. The notification may include, for example, a visual notification, an audio notification, a tacit notification, or a combination thereof.

In some embodiments, the notification informs a user that, since sharing of the stored file with the recipient is restricted, the sharing request has been denied. Accordingly, in association with generating and outputting such a notification, the stored file manager 32 denies the sharing request. In other embodiments, the notification states that sharing of the stored file with the recipient is restricted and includes additional information regarding the sharing restriction, how the sharing restriction may be addressed, or a combination thereof. For example, the notification may include a reason why sharing is restricted, such as by indicating that the stored file includes restricted data that the recipient is not authorized to access. The notification may also include the recipient identifier included in the request and allow a user to modify the recipient identifier, such as to share the stored file with a different recipient (or the same recipient but through a different recipient identifier) without having to re-initiate a sharing request. When a user modifies the recipient identifier to an identifier associated with a recipient authorized to receive the stored file, the stored file manager 32 provides a link to the stored file as described above.

The notification may also include the type, location, or both of restricted data within the stored file. For example, the notification may state that the stored file includes a social security number and may optionally indicate the location of the restricted data within the stored file (for example, by page number, line number, paragraph number, section number, or the like). Accordingly, with this information, a user viewing the notification may be able to manually modify the stored file to remove or redact the restricted data and may, thereafter, initiate a new sharing request to share the modified file with the recipient. Also, in some embodiments, the notification may include a selection mechanism that a user viewing the notification may select to request automatic modification of the stored file to remove or redact the restricted data. When this selection mechanism is selected, the stored file manager (or a separate software application)

modifies the stored file by removing or redacting the restricted data (within the original file or through the creation of a new, separate file) and provides a link to the modified stored file as described above. Thus, in some embodiments, a user may be able to modify the stored file as part of the sharing request without having to initiate a new sharing request. Also, in some embodiments, the stored file manager 32 may automatically modify the stored file when sharing is restricted, inform the user of the modification through the notification, and provide a link to the modified file in response to the sharing request.

Also, in some embodiments, the notification includes a selection mechanism that a user viewing the notification may select to override the sharing restriction. When this selection mechanism is selected, the stored file manager 32 provides a link to the stored file as described above. In some embodiments, before providing the link, the stored file manager confirms whether the user is authorized to override the restriction, such as based on credentials or permissions (one or more authorizations) of the user. For example, the stored file manager may obtain an authorization for the override, such as through the notification or through the user's account with the hosting service that defines the user's role or authorization. Accordingly, the stored file manager 32 may only override the sharing restriction and provide the link when the stored file manager 32 confirms the override authorization. Similarly, when an override is possible but the user initiating the sharing request is not authorized to make such an override, the notification may inform the user of who to contact to seek an override (for example, by providing an email address, a telephone number, or the like). Alternatively or in addition, the stored file manager 32 may contact an authorized user (for example, via email, text, instant message, or the like) to request an override.

Accordingly, although in some embodiments the notification may merely inform a source of a sharing request that the request has been denied, the notification may also provide additional information regarding why sharing is restricted and what actions can be taken to address the restriction. However, when a user does not take (or successfully take) any action to address the restriction, the stored file manager 32 may ultimately deny the sharing request.

Figure 5:
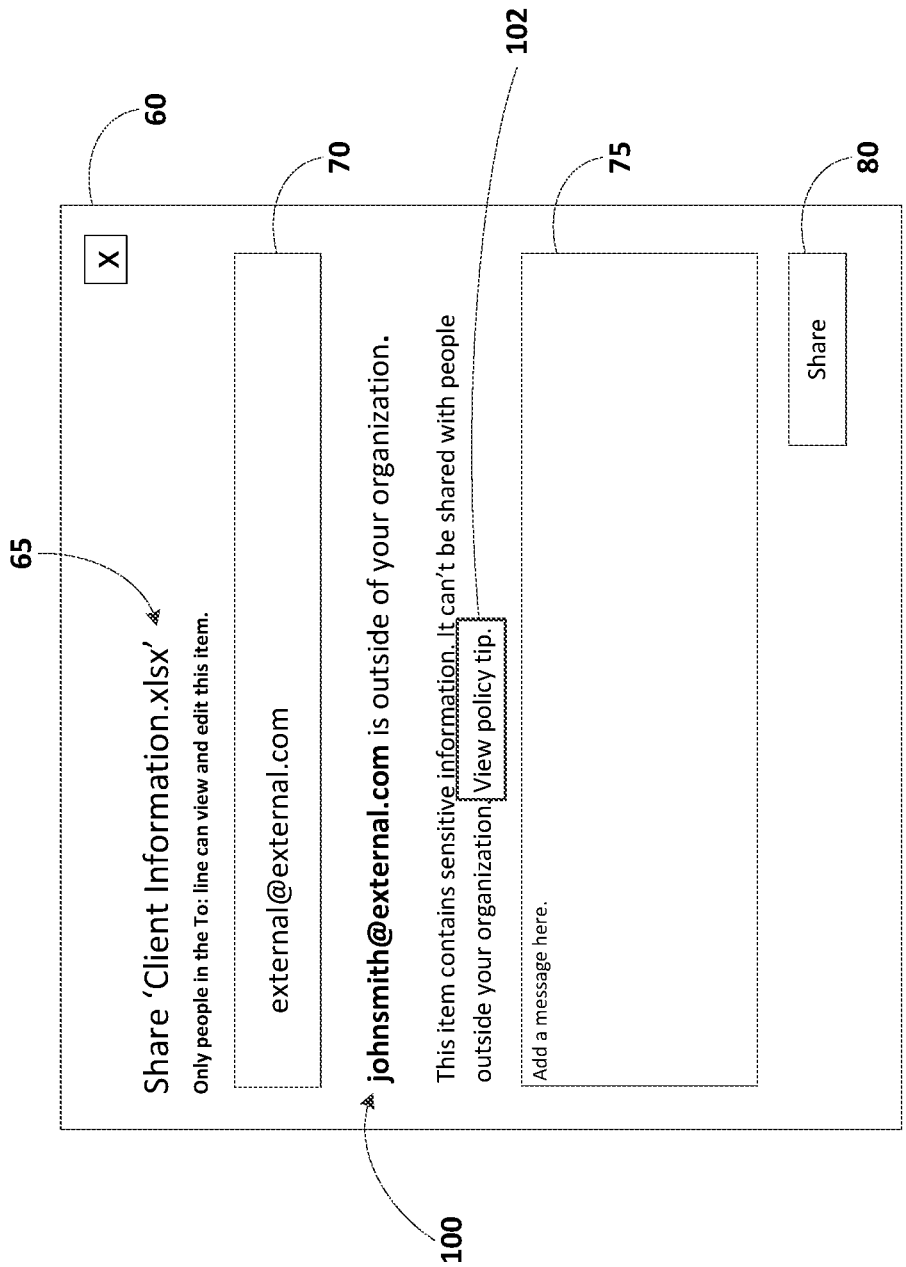
FIG. 5 illustrates the user interface of FIG. 4 outputting a notification to a source of the request according to some embodiments.

FIG. 5 illustrates the user interface 60 including a notification 100 generated in response to a sharing request according to some embodiments. As illustrated in FIG. 5, the notification 100 indicates that sharing of the stored file ("Client Information.xlsx") with the recipient (identified by the email address johnsmith@external.com) is restricted and also includes a reason why sharing the stored file is restricted (the email address is outside of a particular organization, such as an organization associated with the user making the request).

Figure 6:
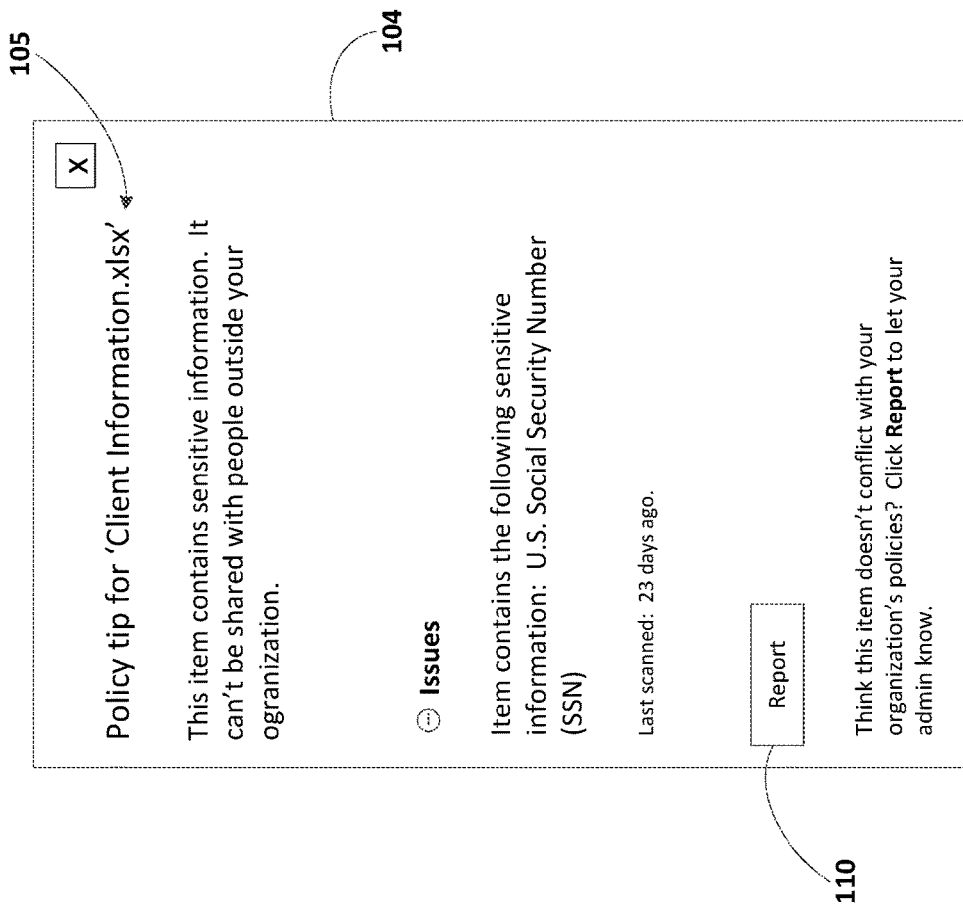
FIG. 6 illustrates a user interface providing additional information regarding a denial of a request to share a stored file with a recipient according to some embodiments.

As noted above, in some embodiments, the notification 100 also provides additional information regarding the sharing restriction (data protection policies, restricted data included in the stored file, and the like) and actions that may be taken to address the restriction. For example, as illustrated in FIG. 5, in some embodiments, the notification 100 includes a link 102. When a user selects the link 102 (for example, by clicking the link 102 with a mouse cursor), additional information may be displayed regarding the sharing restriction, such as a reason sharing is restricted. For example, FIG. 6 illustrates a user interface 104 that may be generated in response to the selection of the link 102. As illustrated in FIG. 6, the user interface 104 includes an identifier 105 of the stored file as well as additional information regarding why sharing of the stored file with the recipient is restricted. The additional information may be customized for the request, the user, the stored file, or a combination thereof. For example, the additional information may indicate that the stored file contains restricted data, what type of restricted data is included in the stored file, where the restricted data is located within the stored file, when the content of the stored file was last scanned, and the like. In some embodiments, the user interface 100 also includes a report button 110. When a user believes that the sharing restriction is an error, the user may select the report button 110 to report the restriction to an administrator.

Thus, rather than merely blocking access to stored files classified as restricted, embodiments described herein block sharing of such stored files to avoid confusion and uphold data protection policies. It should be understood that, in some embodiments, a user may request sharing of a set of stored files with one or more recipients. In this situation, the stored file manager 32 may be configured to determine whether sharing with the identified recipients is restricted for each stored file included in the set of stored files as described above and deny or approve the request accordingly. Also, as noted above, limiting sharing of stored files as described above may be applied within a file hosting service but may also be applied in other file management environments, including managing files locally stored on a user device 14. For example, the stored file manager 32 described above may be executed by the electronic processor 16 of a user device 14 to limit sharing of files locally stored on the user device 14. Also, it should be understood that limiting sharing of stored files as described herein may be performed in response to manual requests to share stored files as well as automated requests to shared stored files. For example, in some embodiments, an organization may execute one or more scripts to automatically share stored files at particular times or in response to particular conditions (for example, at creation of a file, at quarterly review cycles, and the like). Accordingly, the stored file manager 32 may be configured to receive one or more automated requests to share these stored files based on these scripts, which the stored file manager 32 may process and respond to as described above.

Thus, embodiments described herein provide, among other things, systems and methods for limiting sharing of a stored file based on the content of a store file and the intended recipient of the shared file to control access to restricted files at the time of sharing separate from at the time of access. Various features and advantages of some embodiments are set forth in the following claims.

What is claimed is:

1. A system for limiting sharing of a stored file, the system comprising:
  an electronic processor configured to
    receive a request to share the stored file with a recipient, the request including an identifier of the recipient,
    determine whether a classification of the stored file is set to restricted,
    only when the classification of the stored file is set to restricted, compare a first domain included in an email address of the recipient with a second domain,
    determine whether sharing of the stored file with the recipient is restricted based on the identifier of the recipient, content of the stored file, and the comparison of the first domain with the second domain; and when the sharing of the stored file with the recipient is restricted, generate, in response to the request, a notification that sharing of the stored file with the recipient is restricted.

2. The system of claim 1, wherein the stored file is stored within a file hosting service.

3. The system of claim 1, wherein the identifier of the recipient includes an email address of the recipient.

4. The system of claim 1, wherein the electronic processor is further configured to, when the sharing of the stored file with the recipient is restricted, deny the request.

5. The system of claim 1, wherein the notification includes at least one selected from a group consisting of a reason why sharing the stored file with the recipient is restricted, a type of restricted data included in the stored file, and a location of restricted data included in the stored file.

6. The system of claim 1, wherein the electronic processor is further configured to, when sharing of the stored file with the recipient is not restricted, provide a link to the stored file in response to the request.

7. The system of claim 1, wherein the electronic processor is further configured to modify the stored file to remove or redact restricted data included in the stored file and provide a link to the stored file as modified in response to the request.

8. A method of limiting sharing of a stored file, the method comprising:
scanning content of each of a plurality of stored files to identify whether each of the plurality of stored files includes restricted data;
setting a classification of each of the plurality of stored files based on the scanning;
receiving a request to share one of the plurality of stored files with a recipient, the request including an identifier of the recipient;
determining whether the classification of the one of the plurality of stored files is set to restricted;
only when the classification of the one of the plurality of stored files is set to restricted, comparing a first email address domain included in the identifier of the recipient with a second email address domain;
determining, with an electronic processor, whether sharing of the one of the plurality of stored files with the recipient is restricted based on the classification of the one of the plurality of stored files, the identifier of the recipient, and the comparison of the first email address domain with the second email address domain; and
when sharing of the one of the plurality of stored files with the recipient is restricted, generating, with the electronic processor, a notification in response to the request that sharing of the stored file with the recipient is restricted.

9. The method of claim 8, further comprising, when sharing of the one of the plurality of stored files with the recipient is restricted, modifying the stored file to remove or redact restricted data included in the one of the plurality of stored files and providing a link to the one of the plurality of stored files as modified in response to the request.

10. The method of claim 8, further comprising, when sharing of the one of the plurality of stored files with the recipient is restricted, receiving an override authorization, confirming the override authorization based on a user submitting the override authorization, and, when the override authorization is confirmed, providing a link to the one of the plurality of stored files in response to the request.

11. The method of claim 8, wherein generating the notification includes generating the notification including at least one selected from a group consisting of a reason why sharing the one of the plurality of stored files with the recipient is restricted, a type of restricted data included in the one of the plurality of stored files, and a location of restricted data included in the one of the plurality of stored files.

12. The method of claim 8, further comprising, when sharing of the one of the plurality of stored files with the recipient is not restricted, providing a link to the one of the plurality of stored files in response to the request.

13. A non-transitory computer-readable medium including instructions that, when executed by an electronic processor, cause the electronic processor to execute a set of functions, the set of functions comprising:
receiving a request to share a stored file with a recipient, the request including an identifier of the recipient;
determining whether a classification of the stored file is set to restricted;
only when the classification of the stored file is set to restricted, comparing a first email address domain included in the identifier of the recipient with a second email address domain;
determining whether sharing of the stored file with the recipient is restricted based on the identifier of the recipient, content of the stored file, and the comparison of the first email address domain with the second email address domain; and
when sharing of the stored file with the recipient is restricted, generating, in response to the request, a notification that sharing of the stored file with the recipient is restricted.

14. The non-transitory computer-readable medium of claim 13, wherein the set of functions further comprises, when sharing of the stored file with the recipient is not restricted, providing a link to the stored file in response to the request.

15. The non-transitory computer-readable medium of claim 13, wherein determining whether sharing of the stored file with the recipient is restricted includes
determining whether a classification of the stored file is set to restricted; and
when the classification of the stored file is set to restricted, comparing the identifier of the recipient with a list of identifiers.

16. The non-transitory computer-readable medium of claim 13, wherein the notification includes at least one selected from a group consisting of a reason why sharing the stored file with the recipient is restricted, a type of restricted data included in the stored file, and a location of restricted data included in the stored file.

17. The non-transitory computer-readable medium of claim 13, wherein the set of functions further comprises, when sharing of the stored file with the recipient is restricted, modifying the stored file to remove or redact restricted data included in the stored file and providing a link to the stored file as modified in response to the request.

* * * * *